Figure 1:
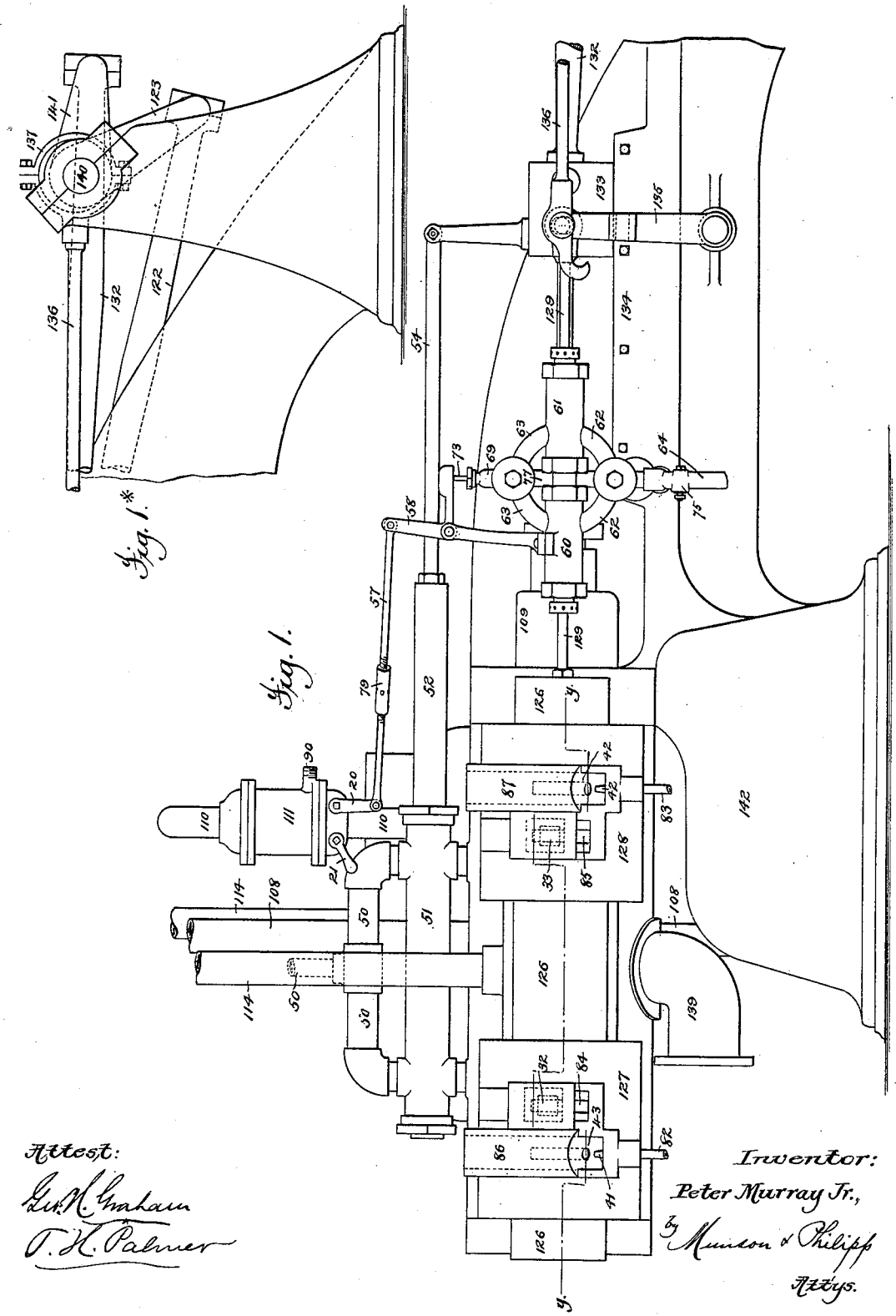

(No Model.) 8 Sheets—Sheet 1.

P. MURRAY, Jr.
GAS ENGINE.

No. 351,394. Patented Oct. 26, 1886.

Attest:
Geo. M. Graham
T. H. Palmer

Inventor:
Peter Murray Jr.,
by Munson & Philipp
Attys.

(No Model.) 8 Sheets—Sheet 2.
P. MURRAY, Jr.
GAS ENGINE.

No. 351,394. Patented Oct. 26, 1886.

Attest:
Geo. M. Graham
T. H. Palmer

Inventor:
Peter Murray Jr.,
by Munson & Philipp
Attys.

(No Model.)　　　　　　　　　　　　　　　　　　　　8 Sheets—Sheet 3.
P. MURRAY, Jr.
GAS ENGINE.
No. 351,394.　　　　　　　　　　　　Patented Oct. 26, 1886.
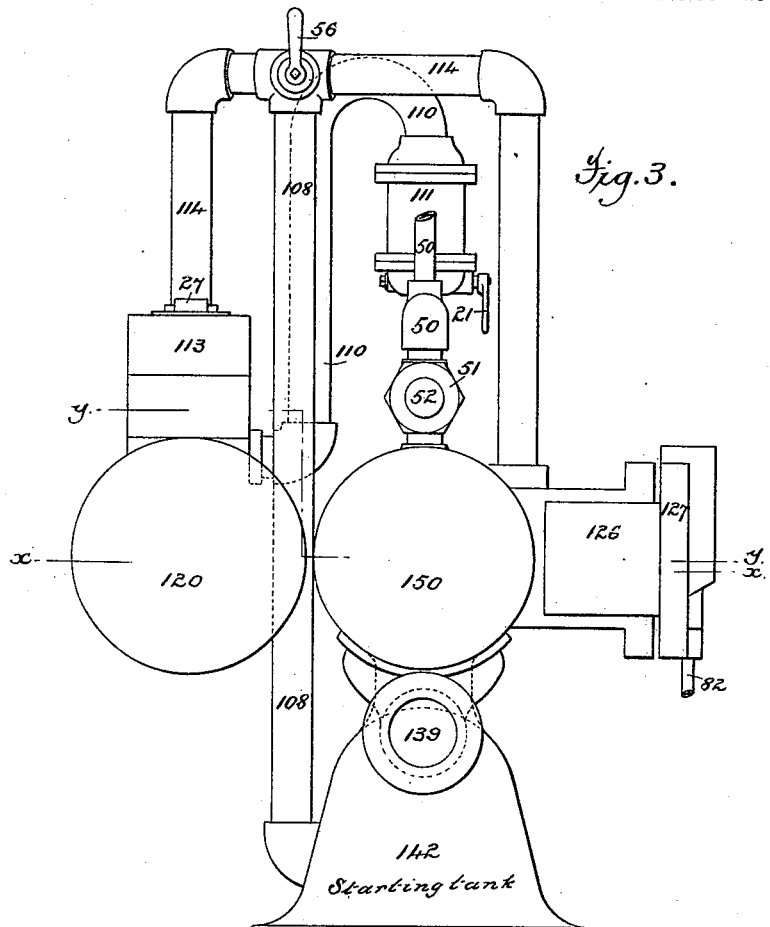
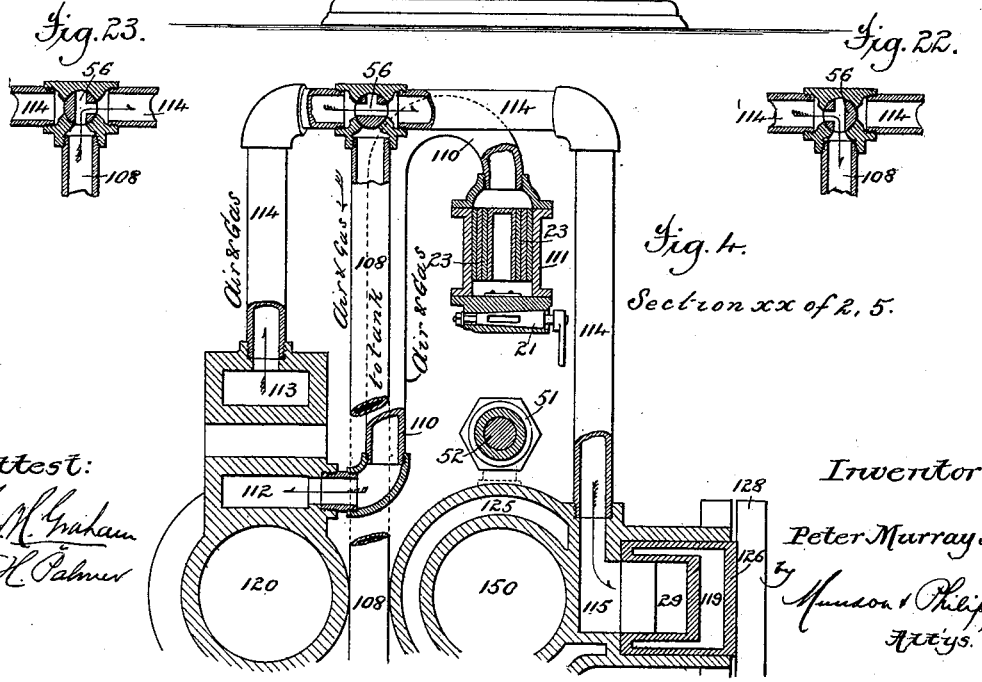

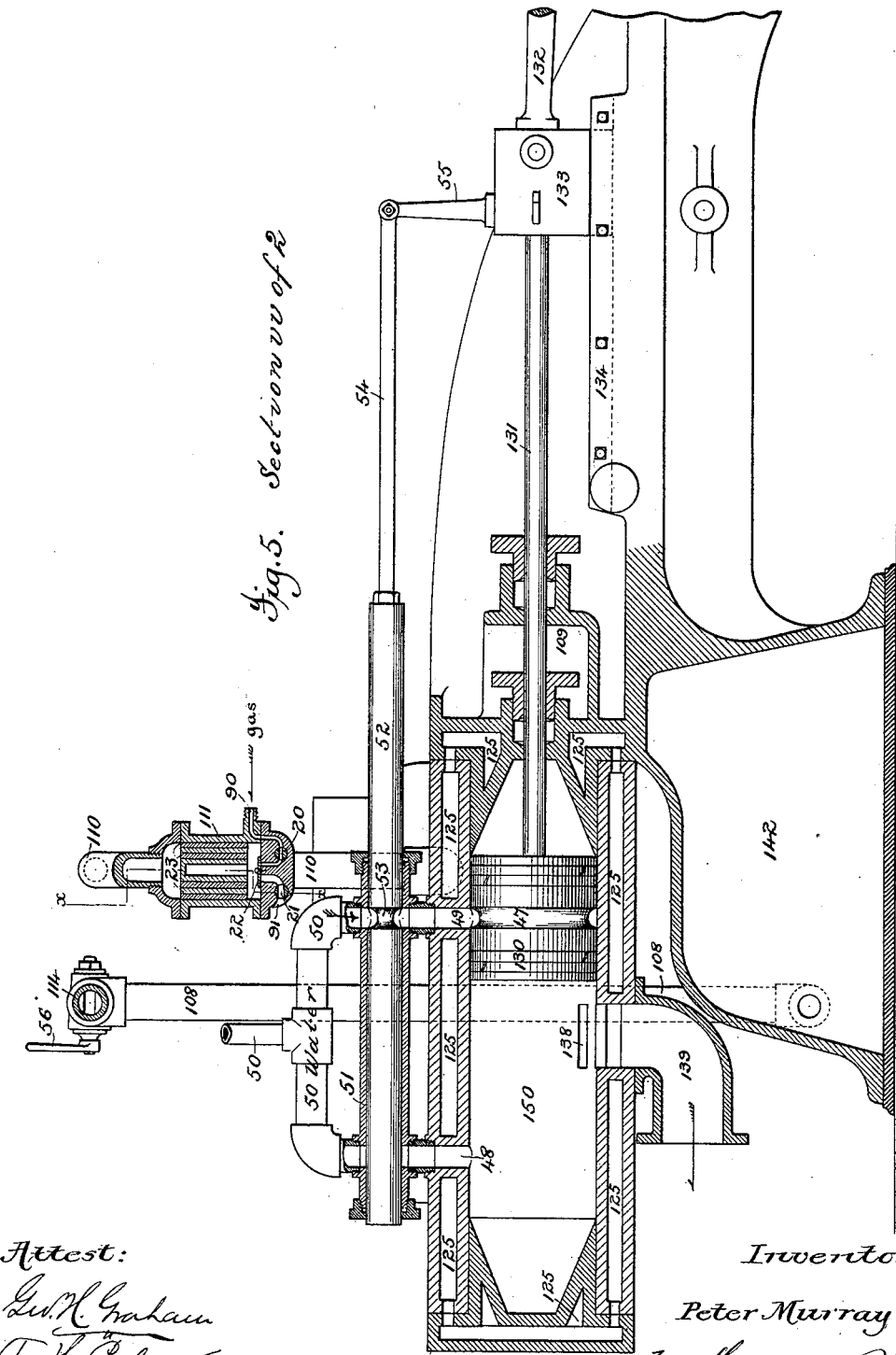

(No Model.) 8 Sheets—Sheet 5.

P. MURRAY, Jr.
GAS ENGINE.

No. 351,394. Patented Oct. 26, 1886.

Section ZZ of 2

—Mixing-valve

Attest:
Geo. H. Graham
T. H. Palmer

Inventor:
Peter Murray Jr.,
by Munson & Philipp
Attys.

(No Model.) 8 Sheets—Sheet 6.

P. MURRAY, Jr.
GAS ENGINE.

No. 351,394. Patented Oct. 26, 1886.

Section xx of 3, 6 and yy of 1, 11.

Section yy of 1, 3, 6, 11.

Attest:
G. M. Graham
J. H. Palmer

Inventor:
Peter Murray Jr.,
by Munson & Philipp
Attys.

(No Model.) 8 Sheets—Sheet 7.
P. MURRAY, Jr.
GAS ENGINE.
No. 351,394. Patented Oct. 26, 1886.
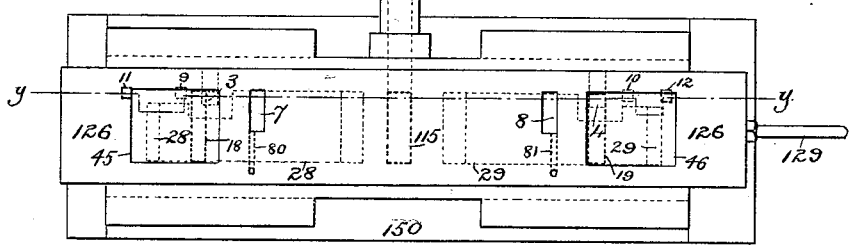
Fig. 11.
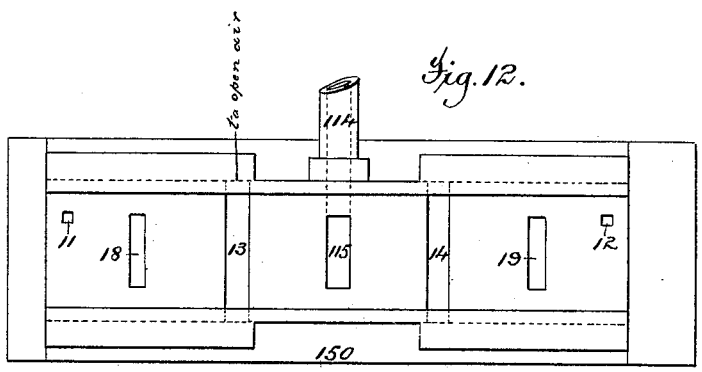
Fig. 12.
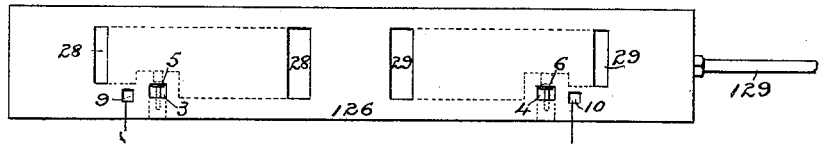
Fig. 13.
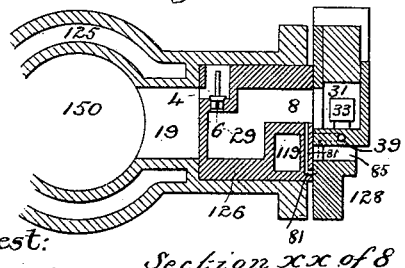
Fig. 9. Section xx of 8
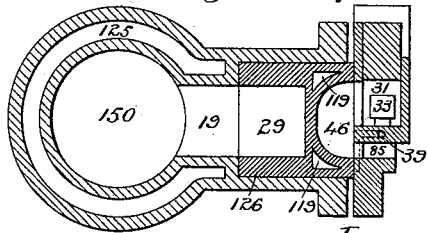
Fig. 10. Section xx of 7
Attest:
G. W. Graham
T. H. Palmer
Inventor:
Peter Murray Jr.,
by Munson & Philipp
Attys.

(No Model.) 8 Sheets—Sheet 8.
P. MURRAY, Jr.
GAS ENGINE.
No. 351,394. Patented Oct. 26, 1886.
Fig. 14.
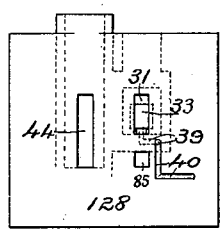
Fig. 15.
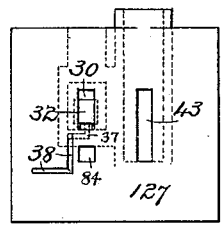
Fig. 16.= Section oo of 2.
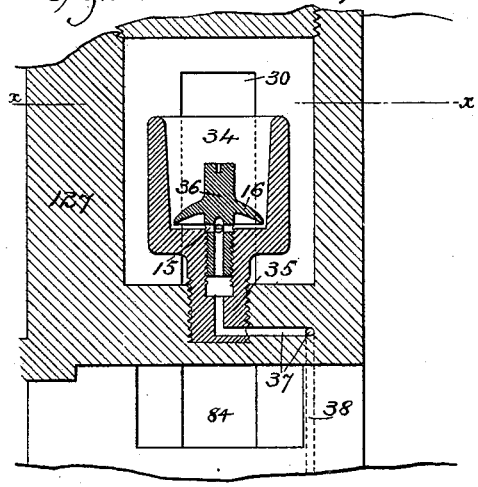
Section xx of 16. Fig. 17.
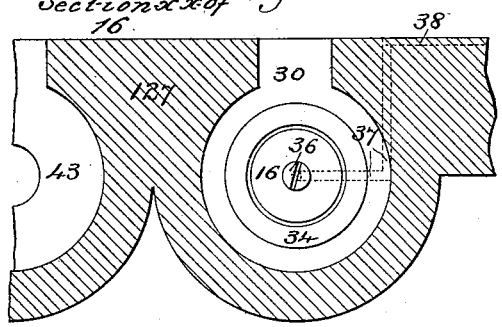
Fig. 18.
Section yy of 2, 19.
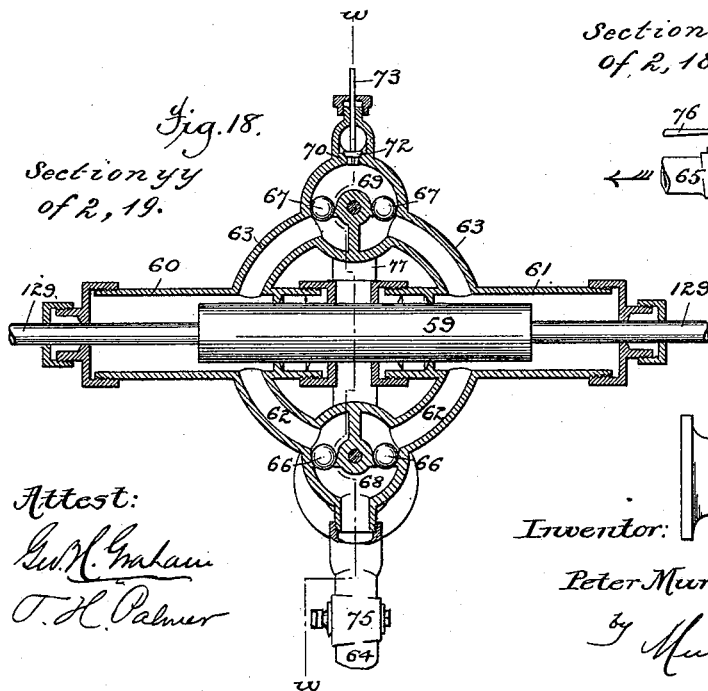
Section ww Fig. 19. of 2, 18.
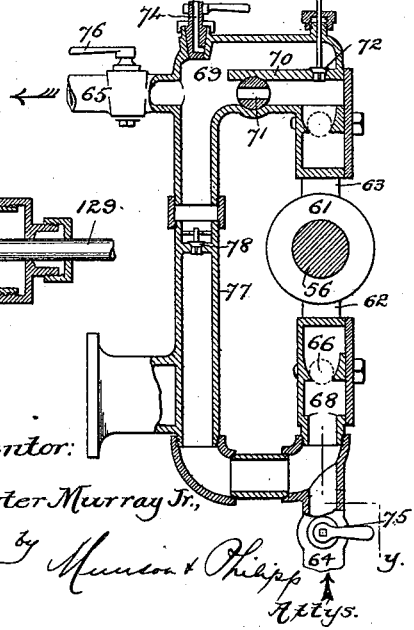
Attest:
Geo. H. Graham
T. H. Palmer
Inventor:
Peter Murray Jr.,
by Munson & Philipp
Attys.

UNITED STATES PATENT OFFICE.

PETER MURRAY, JR., OF NEWARK, NEW JERSEY, ASSIGNOR TO THE MURRAY MOTOR MANUFACTURING COMPANY, OF SAME PLACE.

GAS-ENGINE.

SPECIFICATION forming part of Letters Patent No. 351,394, dated October 26, 1886.

Application filed April 2, 1884. Serial No. 126,365. (No model.)

*To all whom it may concern:*

Be it known that I, PETER MURRAY, Jr., a citizen of the United States, residing in the city of Newark, county of Essex, and State of New Jersey, have invented certain new and useful Improvements in Gas-Engines, fully described and represented in the following specification and the accompanying drawings, forming a part of the same.

This invention relates, generally, to that class of gas-engines in which the power is derived from the explosion in the power-cylinder of a mixture of gas and air, charges of which are admitted alternately upon the opposite sides of the piston.

The invention relates more particularly, however, to that class of these engines in which the explosive mixture, instead of being drawn into the power-cylinder by the movements of the piston, is forced into the cylinder by independent means, and in which also the explosive mixture is confined under a considerable degree of pressure in the cylinder before being exploded.

It is the object of the invention to produce an engine of this class which will be more reliable and uniform in its action, and which will be capable of developing a higher degree of power than those heretofore in common use.

To these ends the invention consists, generally, in devices by which a thorough mixture or commingling of the gas and air forming the explosive mixture is effected prior to the admission of the same to the power-cylinder; in devices for supplying the explosive mixture to the power-cylinder; in devices by which the momentum of the engine, after the explosive mixture is shut-off from the power-cylinder, is utilized to store up a sufficient quantity of the mixture to again start the engine; in devices by which the explosive mixture thus stored up can be admitted to the power-cylinder when it is desired to start the engine; in devices for controlling the admission of the charges of the explosive mixture to the power-cylinder and for firing the same at the proper times; in devices for preventing the flame of the explosion from passing from one end of the power-cylinder to the other; in devices for automatically regulating the strength or richness of the explosive mixture so as to make it conform to the immediate requirements of the engine, and also in various other details of construction and combinations of parts for securing the desired end, all of which will be hereinafter fully explained and particularly pointed out.

In a practical embodiment of the present invention the air and gas which form the explosive mixture are admitted in suitable proportions to a small chamber, which communicates through a suitable conduit-pipe with the suction-chamber of a double-acting force-pump, the piston of which is operated from a crank upon the main shaft of the engine, so that the piston of the pump makes stroke for stroke with the power-piston of the engine. Located in the conduit-pipe, through which the gas and air pass to the suction-chamber of the pump, is a mixing apparatus, through which the gas and air are caused to pass, and by which they are thoroughly mixed or commingled, so as to form a practically homogeneous fluid. The force-chamber of the pump to which the mixed gas and air pass, as just stated, communicates through a suitable conduit-pipe with an induction-chamber at the middle of the power-cylinder. The outlet of this chamber is controlled by a single reciprocating valve, which is operated from an eccentric on the main shaft of the engine, and is provided with two ducts or chambers, which are so arranged that as the valve reciprocates communication is alternately established between the induction-chamber at the middle of the power-cylinder and induction-ports at the opposite ends of the cylinder. This valve is also provided with suitable ducts and ports, by which the charges admitted to the cylinder are fired at the proper time, thus making a single valve perform all the operations necessary to admit the charges of the explosive mixture to and fire them in both ends of the power-cylinder. The conduit-pipe which leads from the pump to the power-cylinder is provided with a branch pipe communicating with a tank or reservoir, preferably located in the base of the engine, and with a three-way cock, which can be so operated that the explosive mixture will be delivered from the pump either directly to the power-cylinder or to the tank, and that the mixture forced into the tank can be allowed to pass to the power-cylinder when desired.

The opening through which the gas passes to the mixing apparatus is provided with a cock, which is controlled by a governor connected to some moving part of the engine, by means of which the quantity of gas which is allowed to enter into the explosive mixture is automatically regulated, so as to vary the richness or strength of the mixture to conform to temporary variations in the running condition of the engine.

The details in construction of the organization thus outlined will now be described in connection with the accompanying drawings, in which—

Figure 2:
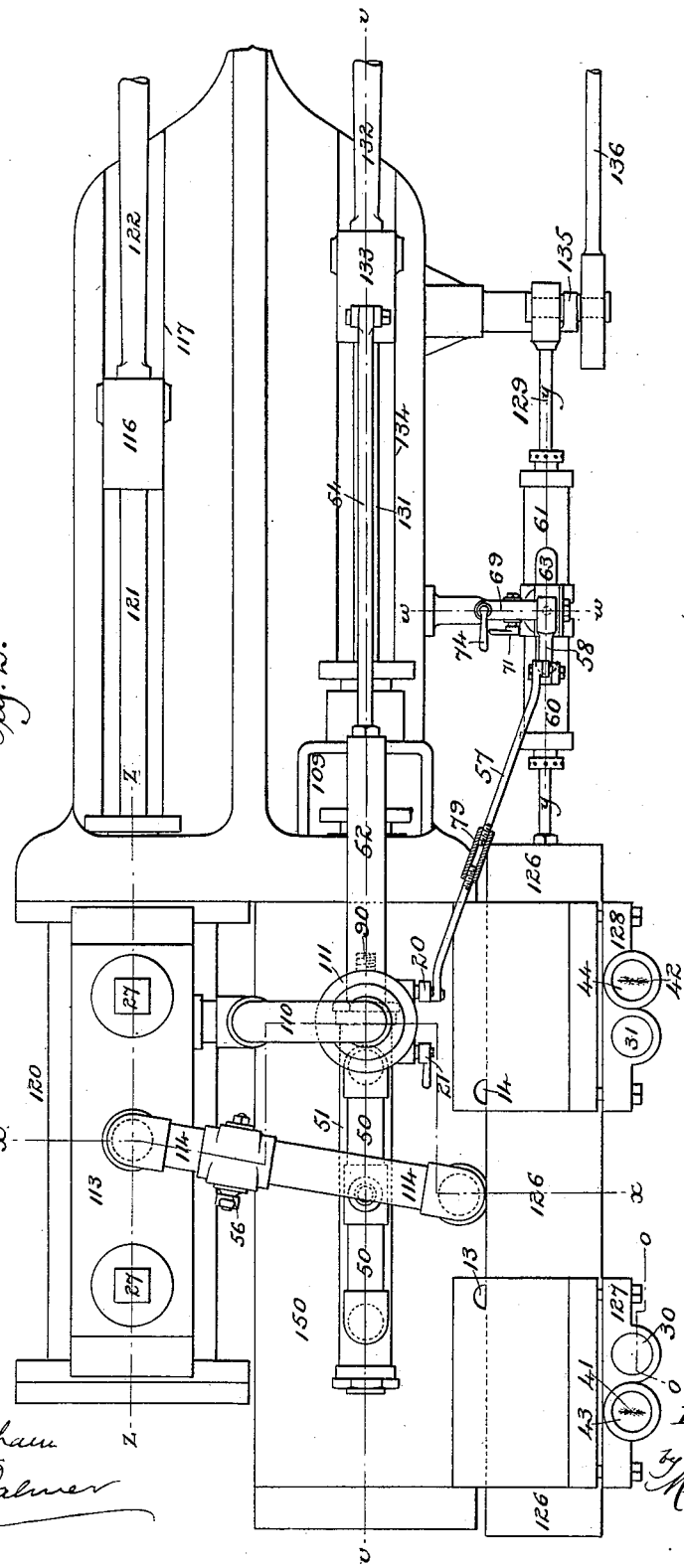
Figure 6:
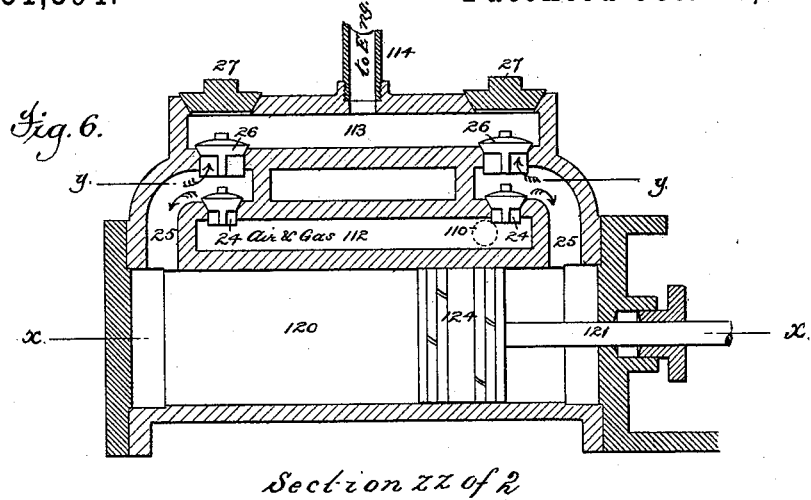
Figure 21:
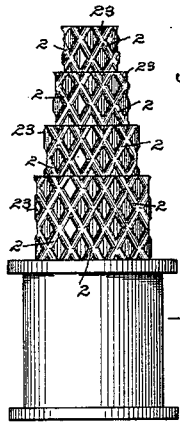
Figure 20:
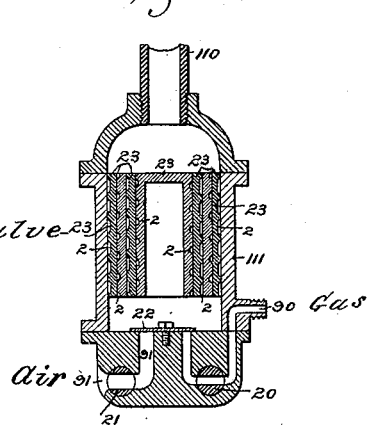
Figure 8:
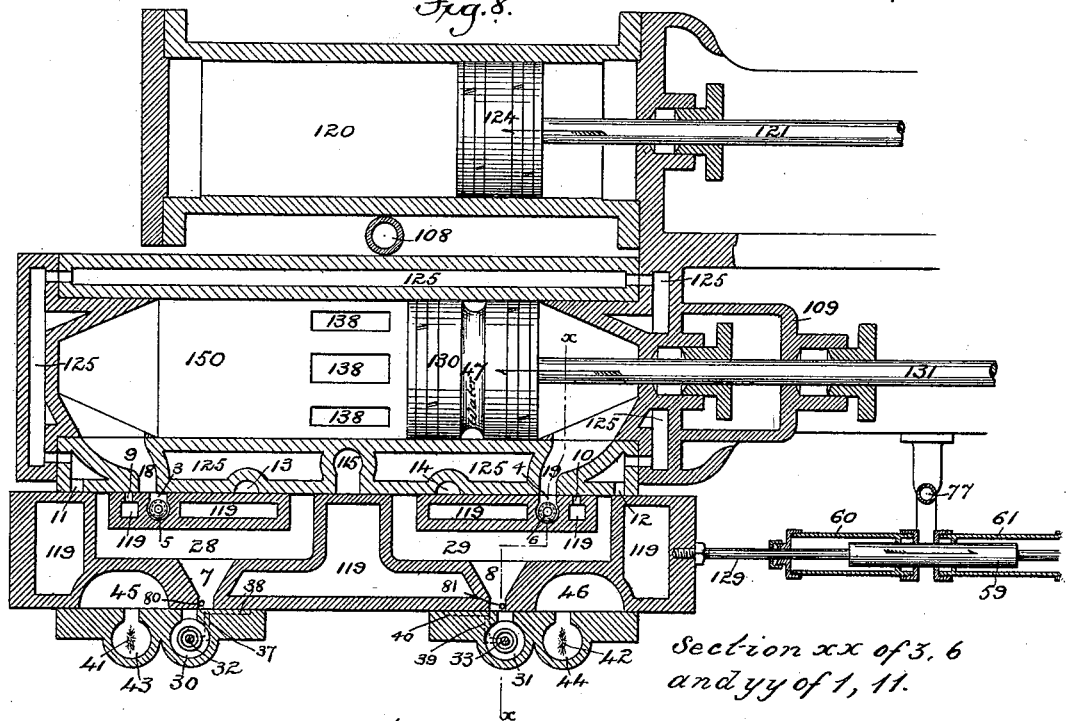
Figure 7:
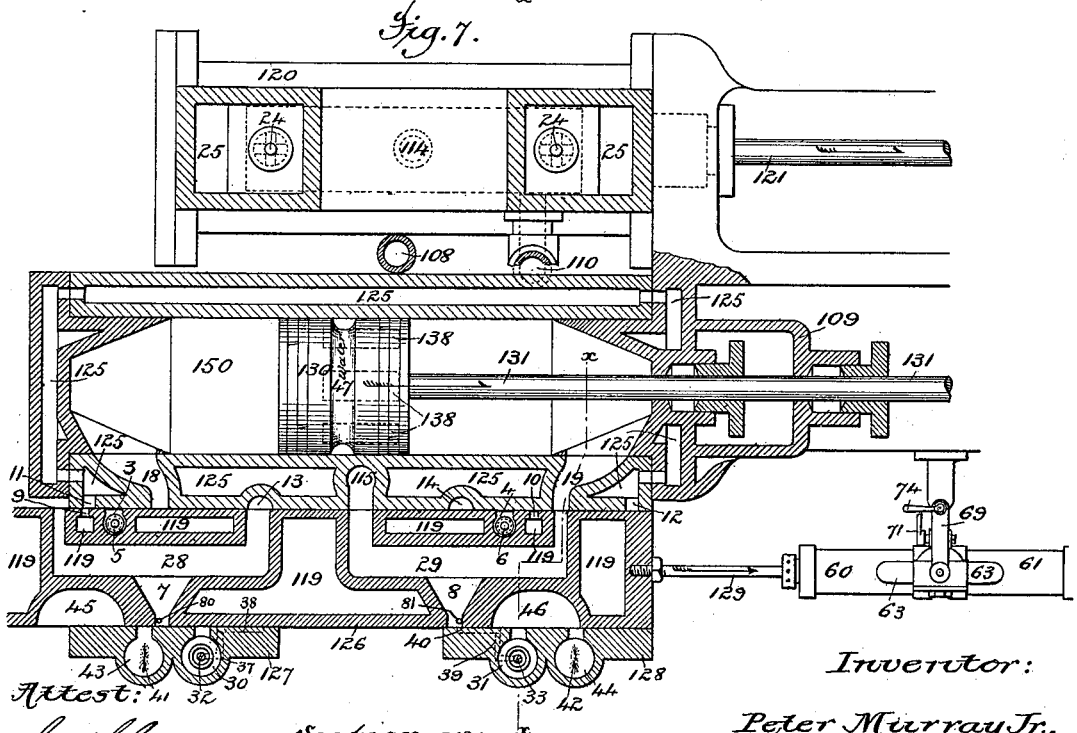

Figures 1 and 1* are a side elevation of a horizontal gas-engine embodying the present invention. Fig. 2 is a plan view of that portion of the engine shown in Fig. 1. Fig. 3 is an end elevation of the engine, looking from the left of Figs. 1 and 2. Fig. 4 is a transverse vertical section taken upon the line $xx$ of Figs. 2 and 5, the induction and igniting valve being, however, in the position shown in Fig. 7. Fig. 5 is a longitudinal vertical section taken upon the line $vv$ of Fig. 2. Fig. 6 is a longitudinal vertical section of the pump, taken upon the line $zz$ of Fig. 2. Fig. 7 is an irregular horizontal section taken upon the line $yy$ of Figs. 1, 3, 6, and 11, showing the parts in the position they will occupy when the forward end of the power-cylinder is receiving a charge of the explosive mixture. Fig. 8 is a similar view taken upon the line $xx$ of Figs. 3 and 6 and the lines $yy$ of Figs. 1 and 11, showing the parts in the position they will occupy at the time the charge is fired in the forward end of the cylinder. Fig. 9 is an irregular cross-section taken upon the line $xx$ of Fig. 8. Fig. 10 is a like view taken upon the line $xx$ of Fig. 7. Fig. 11 is an outside view of the induction and igniting valve, the covering-plates being removed and the valve in the middle of its stroke. Fig. 12 is an outside view of the power-cylinder, the valve being removed so as to expose the induction-chamber and ports. Fig. 13 is an inside view of the induction and igniting valve, showing the same detached from the other parts. Fig. 14 is an inside view of the covering-plate for the forward end of the induction and igniting valve, showing the ports and passages communicating with the igniting-burner. Fig. 15 is a like view of the covering-plate for the rear end of said valve. Fig. 16 is a vertical section upon an enlarged scale, taken upon the line $oo$ of Fig. 2, showing the construction of the igniting-burner. Fig. 17 is a horizontal section upon a like scale, taken upon the line $xx$ of Fig. 16. Fig. 18 is an enlarged vertical section of the governor, taken upon the line $yy$ of Figs. 2 and 19. Fig. 19 is a like view taken upon the lines $ww$ of Figs. 2 and 18. Fig. 20 is a vertical section, upon an enlarged scale, of the mixing apparatus. Fig. 21 is an elevation of said apparatus, showing the parts partially detached from each other to more clearly illustrate their construction. Fig. 22 is a sectional detail showing the cock in the conduit-pipe leading from the pump to the power-cylinder, it being shown in position to direct the explosive mixture into the tank; and Fig. 23 is a like view showing said cock in position to permit the explosive mixture to pass from the tank to the power-cylinder.

Referring to said drawings, it will be seen that the power-cylinder 150 is arranged in a horizontal position upon a suitable framework, which at a proper distance in advance of the cylinder is provided with bearings for the main shaft 140 of the engine. The power-piston 130 is provided with the usual piston-rod, 131, which passes through a suitable stuffing-box in the end of the cylinder, and is connected to the main crank 141 by means of a pitman, 132. The piston-rod and pitman are provided at their point of attachment with the usual cross-head, 133, which moves back and forth upon a suitable track or bearing, 134, formed on the frame-work.

In the organization here shown the explosive mixture, instead of being drawn into the opposite ends of the power-cylinder by the piston 130, is forced into each end of said cylinder after the piston has completed its stroke toward the opposite end of the cylinder and after it has commenced its return-stroke. To effect this result, the engine is provided with a double-acting force-pump, 120, which is located by the side of the power-cylinder, and has its piston or plunger rod 121 connected by a pitman, 122, with a second crank, 123, upon the main shaft 140, the cranks 123 and 140 being so positioned that the piston 124 of the pump will complete its stroke in advance of the power-piston. By reason of this arrangement the entire charge of the explosive mixture is forced into the power-cylinder in front of the power-piston before the latter has completed its stroke, so that it is still further compressed in the cylinder by said piston before the firing operation takes place.

The pitman 122 and the piston-rod 121 of the pump are provided at their point of connection with a cross-head, 116, which moves back and forth upon a track or way, 117, formed upon the frame-work.

In order to effect the rapid and complete combustion of the explosive mixture in the power-cylinder, which must be accomplished in order to attain the best results in an engine of this class, it is necessary that the air and gas which enter into the explosive mixture should be thoroughly mixed or commingled before they pass to the cylinder of the engine, and it has been found in practice that the mixing of the two fluids will not be effected by simply allowing them to flow or be drawn into the same receptacle. It has therefore been found necessary to provide some means by which these fluids will be caused to thoroughly intermingle. This is effected in the present organization by means of a mixing apparatus located at the entrance to the conduit-pipe 110, through which the mixture is drawn to the pump to be forced into the cylinder of the engine. This mixing apparatus is located in a chamber, 111, into which the gas which enters into the explosive mixture is admitted from the source of supply through a pipe, 90, and into which also the air which is to be mixed with the gas to form the explosive mixture is drawn through a passage, 91, as best shown in Figs. 5 and 20.

In order to properly regulate the proportions of air and gas which are to enter into the explosive mixture, the pipe 90 and the passage 91 are provided with cocks 20 21, by which this pipe and passage can be controlled so as to regulate the quantities of air and gas admitted to the chamber 111, and said chamber is provided with an ordinary inwardly-opening valve, 22, which serves to prevent the escape of any of the mixture from the chamber when the pump is not in operation.

The mixing apparatus located in the chamber 111 consists, as shown in Figs 20 and 21, of a series of short tubes, 23, the larger of which is arranged to fit snugly into the chamber, while the others decrease in size so as to fit one within another, the inner tube being either closed at one end, as shown in Fig. 20, or provided with a solid core, if preferred. Each of the tubes 23 is provided either upon its outer or inner surface with a series of spirally-arranged intersecting ducts or channels, 2, which extend from the bottom to the top, and thus form small passages, through which the air and gas must pass before entering the pipe 110. From this construction it will be seen that the air and gas entering the bottom of the chamber 111 must in their passage to the pipe 110 be divided into a large number of small streams, and that by reason of the frequent intersection of the ducts or channels 2, through which these streams must pass, the streams will constantly be broken up and commingled, so that before the two fluids arrive at the pipe 110 they will be thoroughly mixed or commingled with each other, so as to form a practically homogeneous fluid or mixture.

The apparatus herein shown for effecting the mixing of the air and gas may, as will readily be seen, be varied considerably in its construction without departing from the spirit of the invention. Instead of being formed of a series of concentric tubes it may be made by making the intersecting ducts or channels in the face of a thin plate, and then coiling said plate into a spiral which will fit snugly into the chamber 111; or it may be formed of a number of flat plates which are provided upon their faces with intersecting channels, and then placed side by side in the chamber 111; or, in fact, it may be constructed in any convenient manner so long as it provides a number of intersecting and crossing ducts or channels, by which the air and gas are divided into small streams which cross or intersect each other in their passage through the apparatus. After passing the mixing apparatus, as thus described, the explosive mixture passes through the pipe 110 to the suction-chamber 112 of the pump. This chamber is provided with two ports, which communicate with passages 25, leading to the opposite ends of the pump-cylinder, and which are controlled by ordinary suction-valves, 24. The passages 25 are also provided with two valves, 26, through which the explosive mixture drawn into the pump at one stroke of the piston 124 is driven into the force-chamber 113, and thence through the pipe 114 to the induction-chamber 115 of the power-cylinder at the next stroke of said piston. The force-chamber 113 is provided with suitable hand-holes having removable caps 27, through which access can be had to the valves 24 26 when desired.

The cylinder of the pump 120 is of such size with relation to the power-cylinder 150 that the quantity of the explosive mixture which will be drawn through the pipe 110 into the pump and forced out of the pump through pipe 114 at each stroke of the piston 124 will be just sufficient to form one charge in the power-cylinder when the engine is running under its ordinary working conditions.

The power-cylinder 150 is provided at its opposite ends with induction-ports 18 19, through which the charges of the explosive mixture are admitted to the opposite ends of the cylinder from the chamber 115, and these ports are controlled by a single valve, 126, which not only serves to control the admission of the charges to the cylinder, but also to ignite said charges at the proper times. This valve is arranged to slide in suitable bearings formed upon the side of the cylinder, as shown in Figs. 1 and 2, and is held in position by means of two supporting-plates, 127 128, which are bolted or otherwise secured to the bearings, as shown in Fig. 2. This valve is provided with a rod, 129, the end of which is connected to a stud extending from a rock-arm, 135, which is pivoted to the frame-work, and is provided with a second stud, which is engaged by a recess in a rod, 136, which is operated from an eccentric, 137, upon the main shaft 140, so as to give the proper movements to the valve.

The power-cylinder is provided with a single exhaust-outlet consisting of one or more ports, 138, located at the middle of its length, through which the products of combustion are exhausted from both ends of the cylinder. This outlet is not provided with an exhaust-valve, but communicates directly with the open air through a pipe, 139. This cylinder is also provided with the usual water-spaces, 125, through which water is caused to circulate in the usual manner to prevent the undue heating of the parts by the explosion of the charges.

To effect the admission to and the firing of the charges of the explosive mixture in the opposite ends of the cylinder at the proper times, the valve 126 is provided with two ducts or chambers, 28 29, which are so arranged that at certain points in the movement of the valve they will open communication between the chamber 115 and the ports 18 19, respectively, so as to admit the mixture from said chamber into the opposite ends of the cylinder.

It has already been stated that the piston 124 of the pump which forces the mixture into the power-cylinder is set in advance of the power-piston, from which it results that the pump commences to force a charge of the mixture into the chamber 115 before the piston 130 has arrived at the end of its stroke. The valve 126 is also so timed that communication between the chamber 115 and the induction-port of that end of the cylinder which is to receive the charge will not be established until the power-piston has proceeded some distance upon its return-stroke. Just before the power-piston arrives in position, however, to cover the exhaust-ports, the valve 126 will arrive in position to open communication between the chamber 115 and the end of the cylinder toward which the piston is proceeding, so as to permit the mixture confined in the chamber 115 and the cylinder of the pump to pass into the power-cylinder in time to expel the products of combustion remaining therein through the exhaust-ports before they become covered by the power-piston. The valve 126 and the piston 124 of the pump are so timed with relation to each other that just as soon as the piston 124 has completed its stroke the valve will shut off communication between the chamber 115 and the end of the power-cylinder which is receiving its charge, and thus confine the charge in the power-cylinder, so that it will be compressed therein by the power-piston as it moves forward to complete its stroke.

The duct 28 of the valve 126 is provided with a lateral port, 3, which is so positioned that when the valve has proceeded a short distance beyond the point at which communication between the chamber 115 and the port 18 is cut off it will open communication between said duct 28 and the port 18. The duct 28 is also provided with a second lateral port, 7, which is so positioned that at the same time the duct and the port 18 are brought into communication, as just stated, communication will also be established between said duct and a recess, 30, in the plate 127, in which recess is located a burner, 32, so that the flame of said burner will be communicated to the mixture confined in the duct 28, and thence through the port 3 to the charge confined in the cylinder.

The port 3 is provided with a valve, 5, which opens inwardly, so as to permit the flame produced by the explosion of the mixture in the duct 28 to pass inward to the charge in the cylinder, and closes so as to prevent the escape of any of the products resulting from the explosion of said charge.

The duct 29 is provided with lateral ports 4 8, similar to the ports 3 7, which open communication at the proper time between said duct and the port 19 and permit the firing of the charge in the opposite end of the cylinder from a burner, 33, located in a recess, 31, in the plate 128. The port 4 is also provided with a valve, 6, similar to the valve 5, which operates in the same manner to prevent the escape of the products of combustion after the explosion takes place. The valve 126 is also provided with suitable cavities, 119, having ports 9 10, which are located in the opposite ends of the valve, and are so positioned that as the valve reaches the limit of its movement in each direction they will respectively come into communication with corresponding ports, 11 12, in the opposite ends of the cylinder, and thus permit a small amount of water to pass from the spaces 125 into the cavities 119 of the valve, where it will be converted into steam by the heat caused by the explosion in the ducts 28 29. The ports 9 10 are also so positioned that as the valve commences its stroke in either direction they will respectively come opposite the ports 18 19, and thus permit the steam generated in the cavities 119 to pass into the power-cylinder and aid in expelling the products of combustion therefrom, and also serve to lubricate the interior of the cylinder.

By reference to Figs. 11, 12, and 13 it will be seen that the ends of the ducts 28 29, which come into communication with the induction-ports 18 19, are of less extent vertically than said ports, and that the ports 9 10 and 11 12 of the cavities 119 and water-spaces 125 are located higher than the upper edges of said ends of said ducts, so that, although the water is permitted to pass from the ports 11 12 into the ports 9 10, it is not permitted to pass from said first ports into the ducts 28 29 as the valve reciprocates.

The face of the power-cylinder upon which the valve 126 reciprocates is provided with two vertical channels, 13 14, which communicate with the open air at the top of the valve-casing, as shown in Fig. 2, and these channels are so positioned that as the valve reaches the limit of its stroke in either direction they will respectively open communication between the open air and the ducts 28 29, the opposite ends of said ducts being at the same time exposed to the open air by being carried beyond the ends of the port-face of the cylinder, as shown in Fig. 7. From this it results that after each explosion the ducts 28 29 are brought into communication at both ends with the open air, so that the air can circulate freely through said ducts and expel the products of combustion therefrom before the valve has moved into position to again bring said ducts into communication with the chamber 115. By thus causing the ducts 28 29 to be filled with air after each explosion, and before they again become filled with the explosive mixture, a quantity of air will always be forced into the power-cylinder in advance of each charge of the explosive mixture, and this will not only serve to expel all the remaining products of combustion from the cylinder, but will prevent the explosive mixture from coming into contact with any flame which may remain in the cylinder, and thus prevent all danger of a premature explosion of the charge.

The burners 32 33, before mentioned, which are located in the recesses 30 31 of the plates 127 128 and serve to ignite the charges in the opposite ends of the power-cylinder, are exact duplicates, each consisting of a cup-shaped body, 34, (see Fig. 16,) having a threaded tubular stem, 35, which is screwed into the bottom of the recesses in which the burner is located. The cup-shaped body 34 is provided with a tubular plug, 36, which is screwed into the opening in the bottom of the cup, and is provided with a bell-shaped flange, 16, located a short distance from the bottom of the cup, said plug being provided with a number of lateral openings, 15, through which the mixture to supply the burner passes, so as to emerge around the edges of the bell-shaped flange 16 and form an annular flame when ignited. By making the burner of this form a very large surface of flame is produced through the consumption of a comparatively small amount of the explosive mixture, and by locating this burner in the bottom of the cup-shaped body 34 the mixture, in coming in contact with the flame to be ignited, must pass downward into the cup, so that the flame is protected from being extinguished by the force of the current of the mixture issuing through the ports 7 and 8. By adjusting the position of the plug 36 the openings 15 can be closed to a greater or less extent, so as to vary the amount of the mixture supplied to the burner, and thus regulate the size of the flame.

The stem 35 of the igniting-burner 32 is provided with a laterally-extending duct, 37, which bends inwardly (see Figs. 16 and 17) and opens into a vertical channel, 38, formed in the inner face of the plate 127, which channel, after extending downward a short distance, bends horizontally (see Fig. 15) in such position as to communicate with a duct, 80, which passes downward from the port 7, and then bends so as to open upon the outer face of the valve 126, as shown in Figs. 7, 8, and 11.

The stem of the igniting-burner 33 is provided with a duct, 39, similar to the duct 37, which communicates with a channel, 40, similar to the channel 38, formed in the inner face of the plate 128, (see Fig. 14,) in such position as to communicate with a duct, 81, similar to the duct 80, which passes downward from the port 8, and then bends so as to open upon the outer face of the valve 126, as shown in Figs. 7, 8, 9, and 11. In addition to the ducts and channels just mentioned, the plates 127 128 are provided just beneath the recesses 30 31 with transverse ports 84 85, the purpose of which, as well as of the ducts and channels just mentioned, will be made clear when the operation of the engine is described.

The igniting-burners just described are not kept permanently lighted, but are extinguished at or just after the explosion of each charge and are again relighted just before the time for the next explosion. The relighting of these burners is effected by means of permanent burners 41 42, which are located in recesses 43 44, just at the sides of the burners 32 33, and are fed through pipes 82 83 from any permanent source of supply, these burners being provided with the usual chimneys, 86 87, to secure proper draft.

The valve 126 is provided upon its outer face with two recesses, 45 46, which are so positioned that while the charge is being admitted to the cylinder the recesses in which the permanent and igniting-burners are located will be brought into communication with each other and with the port beneath the igniting-burner, as shown in Figs. 7 and 10. When the parts are in this position the heat generated by the permanent burner will cause a current of air to be drawn through the port beneath the igniting-burner and the recess in the valve to the recess in which the permanent burner is located, and this will cause the explosive mixture, which is at the same time being fed to the recess in which the igniting-burner is located, to be carried to the permanent burner, and thus communicate the flame backward to the igniting-burner. After the igniting-burner at either end of the valve has been thus lit, and before the valve arrives in position to fire the charge, communication between the permanent and igniting burner will be cut off, as shown in Fig. 8, so that the explosion of the charge will not have the effect of extinguishing the permanent burner, all of which will more fully appear when the operation of the engine is explained.

In operating engines of this class, wherein the charge of the explosive mixture is admitted upon one side of the power-piston while said piston is being driven forward by the explosion of the charge upon the other side, it has sometimes happened that the flame from the charge just exploded behind the piston has been communicated past the piston to the explosive mixture being admitted upon the opposite side. To avoid this danger and difficulty, the power-piston of the present organization is provided with a circumferential groove or recess, 47, and with means by which, just before each explosion takes place, a quantity of water is allowed to flow into this groove so as to completely surround the piston with a water ring or packing, which will effectually prevent the flame resulting from the explosion from forcing itself past the piston. To effect this result the cylinder is provided at its opposite ends with ports 48 49, which are in such position as to open into the groove 47 when the piston is at the limit of its stroke in each direction, and which communicate with the two branches of a pipe, 50, which is filled with water from the same source that supplies the spaces 125 of the cylinder, or from any other convenient source of supply. The two branches of the pipe 50 are connected by a cylinder, 51, in which works a plunger, 52, which is provided with a circumferential groove, 53, corresponding in position with the groove 47 of the power-piston, and is connected by a rod, 54, with an upright arm, 55, extending from the cross-head 133 of main piston-rod. From this construction it results that as the power-piston arrives at each end of its stroke communication is opened between the pipe 50 and the groove 47, so that the water flows from said pipe into said groove and forms a water-packing around the piston, which packing remains around the piston as it moves forward on its return-stroke, and thus prevents the possibility of any flame being communicated past it to the opposite end of the cylinder until after it has passed the exhaust-ports 138. The water thus admitted to the cylinder will at each stroke of the piston pass out through the exhaust-ports and escape to the open air.

To prevent the undue heating of the piston-rod 131 and consequent destruction of the packing in the stuffing-box in the end of the cylinder through which the rod passes, the end of the cylinder is provided with a receptacle, 109, which is kept filled with water to such a height as to surround the piston-rod, and thus keep it sufficiently cool to prevent the destruction of the packing. To prevent the escape of the water from the receptacle 109, the end of this receptacle is also provided with a stuffing-box of the usual construction, through which the piston-rod passes.

From the foregoing description it will be observed that when the engine is once stopped it will be necessary, in order to set it again in motion, to turn the main crank-shaft sufficiently to cause the pump to force a charge of the explosive mixture into the power-cylinder and then to bring the valve 126 into position to fire said charge. It will also be readily understood that, particularly in engines of large size, this operation would entail considerable labor, and would be otherwise undesirable and troublesome. To obviate this difficulty, a tank, as 142, is provided at some convenient point, preferably in the base of the supporting framework of the engine, as in the present case, and the pipe 114 is provided with a branch pipe, 108, which communicates with said tank. The pipe 114, at the point of its intersection with the pipe 108, is provided with a three-way cock, 56, which can be so operated, as shown in Figs. 4, 22, and 23, as to cause the explosive mixture to pass, either directly from the pump to the power-cylinder, as already explained, or from the pump to the tank 142, or from the tank 142 directly to the power-cylinder. By this means it is only necessary when it is desired to stop the engine to turn the cock 56 to the position shown in Fig. 22, which will shut off the further admission of the explosive mixture to the power-cylinder, and thus cause the engine to gradually come to rest. Before coming to rest, however, the momentum of the parts will cause the engine to make several revolutions, and in doing this several charges of the explosive mixture will be forced into the tank 142 and confined therein under a considerable degree of pressure. Whenever thereafter it is desired to start the engine, it may be done by turning the cock 56 to the position shown in Fig. 23, which will allow the explosive mixture confined in the tank 142 to pass to the induction-chamber 115, from which it may be admitted to the power-cylinder by disconnecting the rod 136 from the rock-arm 135 and moving the valve-rod 129 by hand, which can be readily done by means of an ordinary starting-bar, (not shown,) with which the rock-arm 135 is provided, until the valve 126 is in proper position to admit a charge to one end of the cylinder and then further moving the valve until it is in position to fire the charge thus admitted. As soon as one or two charges have been thus admitted and fired and the engine has attained a small degree of speed the cock 56 can be turned to the position shown in Fig. 4, so as to permit the explosive mixture to pass directly from the pump to the induction-chamber 115, and the engine will then resume its regular operation.

As the labor which the engine is called upon to perform is liable to vary temporarily, it is desirable to provide a governing apparatus by which any undue variation in speed by reason of a sudden increase or decrease in the load upon the engine can be obviated. This may be effected in this class of engines either by varying the quantity of the explosive mixture supplied to the power-cylinder at each stroke of the pump or by varying the quantity of gas which enters into said mixture, and thus increasing or decreasing its strength or richness. The latter method has been adopted in the present case, and for this purpose the cock 20, which controls the pipe 90, through which the gas passes to the mixing apparatus, is connected, through a rod, 57, with a bell-crank lever, 58, which is connected to a governor, which acts, when the speed of the engine increases beyond or falls below what is desirable, to close or open the cock, and thus diminish or increase the quantity of gas which is allowed to enter the mixing apparatus, thereby decreasing or increasing the strength of the explosive mixture, and consequently its power when exploded. To effect this the valve-rod 129 is provided with a plunger, 59, (see Figs. 18 and 19,) the opposite ends of which enter two water-cylinders, 60 61. These cylinders are provided with induction and eduction ports 62 63, which communicate with suction and force chambers 68 69, which are connected with induction and eduction pipes 64 65, and are controlled by ordinary ball-valves, 66 67.

The induction and eduction pipes 64 65 may be connected with the water-spaces in the power-cylinder, so as to cause a circulation of water through said spaces, or they may be connected with a tank or other suitable source of supply and discharge.

The force-chamber 69 is provided with a diaphragm or partition, 70, which divides the chamber into two compartments, the upper of which opens directly into the eduction-pipe 65, while the lower communicates with the upper through two ports or passages, one of which is controlled by a cock, 71, and the other by a weighted valve, 72, the stem 73 of which engages with the horizontal arm of the bell-crank lever 58. The cock 71 will be so adjusted that when the engine is operating at its normal speed the amount of water drawn into either of the cylinders 60 or 61 at one stroke of the plunger 59 can be ejected through the cock 71 and the port beneath the valve 72 at the next stroke of said plunger without offering sufficient resistance to raise the valve 72 above its normal position. When, however, the speed of the engine becomes accelerated beyond what is desirable, the water drawn into the cylinders 60 61 by the plunger will be forced into the force-chamber 69 so fast that in escaping it will raise the valve 72 above its normal position, in doing which it will rock the bell-crank lever 58, and consequently close the cock 20, so as to reduce the amount of gas which will be permitted to enter into the explosive mixture, and thus tend to reduce the power of the engine until the normal speed is again attained, when the valve 72 will drop back to its normal position and allow the cock 20 to again open. If the speed of the engine falls below what is desirable, the water drawn into the cylinders 60 61 will be forced into the force-chamber so slowly that it will permit the valve 72 to fall below its normal position, so as to allow the weighted arm of the bell-crank lever 58 to open the cock 20 and permit more gas to be drawn into the explosive mixture.
In order to permit the formation of a partial vacuum in the force-chamber 69, said chamber is provided with a cock, 74, through which a small amount of air may be allowed to enter said chamber when desired. The induction and eduction pipes 64 65 are provided with cocks 75 76, and the suction and force chambers are connected by a pipe, 77, so that by closing said cocks the water, instead of being drawn into the governor through the pipe 64 and ejected therefrom through the pipe 65, may be allowed to simply pass from the force-chamber back to the suction-chamber.

The pipe 77 is provided with a valve, 78, which of course will be opened and kept in an open condition when the cocks 75 76 are closed, or will be closed when said cocks are opened. When it is not desired to so construct the governing apparatus that the fluid can be allowed to pass from the force-chamber back to the suction-chamber, the pipe 77 may be omitted altogether.

Instead of providing two cylinders, as 60 61, for the opposite ends of the plunger 59, a single cylinder may be used, the plunger working through a partition or diaphragm in its middle; or instead of using a plunger an ordinary double-acting piston may be used. It is also to be understood that whether a plunger or a piston is employed it is not necessary that it should be located upon the valve-rod, as it may be upon the piston-rod of the power-cylinder or of the pump, or upon an independent rod which is connected to any moving part of the engine, as, for example, the rock-arm
135. It is also to be understood that the rod 57, instead of being connected to the cock 20, so that the governor will control the speed of the engine by varying the amount of gas admitted to the mixing-chamber, may be connected to a cock or valve arranged in a manner similar to that shown in my application for Letters Patent filed October 27, 1883, Serial No. 110,192, which will be operated when the engine attains too high a rate of speed so as to permit the explosive mixture to pass from the force to the suction side of the piston 124 of the pump, and thus reduce the quantity of the explosive mixture supplied to the power-cylinder.
It is of course to be understood that any other liquid may be used in the governing apparatus instead of water if found more desirable, or that, if preferred, air may be used instead of a liquid, or that the valve 72, for controlling the cock 20, may be used upon the suction instead of the force side of the pump. It will also be seen that by a slight modification of the parts the valve may be caused to act by the formation of a partial vacuum, instead of by the force of the liquid or fluid. The rod 57, which connects the cock 20 with the bell-crank lever 58, is, as will be observed by reference to Figs. 1 and 2, made in two parts, which are connected by a right and left hand screw-threaded sleeve, 79, so that the rod can be lengthened or shortened to effect the proper adjustment of the cock 20 to allow any desired quantity of gas to enter into the explosive mixture.
The operation of the organization just described is as follows: For the purpose of describing this operation it will be assumed that the engine is in operation and that the power-piston has arrived in such position in its forward stroke toward the main crank-shaft as to cover the exhaust-ports 138, and that the valve 126 has reached the limit of its stroke in the opposite direction, so as to open communication through the duct 29, between the induction-chamber 115 and the induction-port 19, and permit the explosive mixture to pass from the pipe 114 to the power-cylinder in front of the advancing piston, as shown in Fig. 7. At the same time that the duct 29 is brought into communication with the chamber 115 and port 19 the duct 81 will be brought into communication with the channel 40, so that a part of the explosive mixture which enters the duct 29 will pass through the duct 81 into the channel 40, thence through the duct 39 to the burner 33 and inward into the recess 46, from which it will be drawn by the current of air passing inward through the port 85 into the recess 44 and become ignited by the flame of the permanent burner 42, and thus effect the lighting of the igniting-burner 33, which will then continue to burn, it being fed by the constant stream of the mixture passing through the duct 81, channel 40, and duct 39. After this takes place the pistons 124 and 130 will continue to advance until the piston 124 arrives at the end of its stroke toward the main crank-shaft and forces the entire charge of the explosive mixture out of the pump. By the time the piston 124 has arrived in this position the valve 126 will have commenced its stroke in the same direction and have arrived in such position as to cut off communication between the chamber 115 and port 19 and confine the charge of the explosive mixture in the power-cylinder. When the parts have arrived in this position, the piston 124 of the pump will be reversed so as to commence its stroke in the opposite direction, and force a fresh charge of the explosive mixture into the pipe 114 and chamber 115, while the power-piston 130 will continue and complete its stroke toward the main crank-shaft, thus compressing the charge admitted to the cylinder, as just explained, and at the same time the valve 126 will have continued to move forward so that when the power-piston has arrived at the end of its stroke the port 4 will be brought into communication with the port 19 and the port 8 into communication with the recess 31, while communication will be cut off between the igniting and permanent burners 33 42, all as shown in Fig. 8. This will bring the igniting-burner into direct communication with the explosive mixture in the duct 29, so as to explode the same, and the flame resulting from the explosion of the mixture in the duct 29 will be forced by said explosion past the valve 6 into the port 19, so as to fire the charge confined in the power-cylinder, and thus start the piston 130 upon its return-stroke. As soon as the explosion takes place in the power-cylinder the great pressure of the gases confined therein will close the valve 6, so as to prevent the escape of any of said gases backward into the duct 29.

From the foregoing it will be observed that during the period when the charge is being admitted to the power-cylinder, as just stated, the igniting-burner 33 is fed with the explosive mixture at a constantly-increasing pressure, due to the fact that during this period the charge is being compressed between the pistons of the pump and of the power-cylinder. As soon, however, as the valve 126 has moved to such position as to cut off communication between the chamber 115 and the port 19, the burner will commence to be fed with the mixture at a constantly-decreasing pressure, due to the fact that the burner is fed from the mixture confined in the duct 29, and that the quantity of the mixture so confined in said duct is being constantly reduced in supplying the burner. From this it results that after communication has been cut off between the chamber 115 and the port 19 the flame of the igniting-burner grows smaller quite rapidly, so that by the time the valve 126 has cut off communication between the recess 31 and the port 85, so that no air is supplied to the burner to support combustion, the flame will have become so small that the air confined in the recess 31 will keep the flame alive, even though the valve moves quite slowly, until the port 8 is brought opposite the recess, so as to permit the mixture in the duct 29 to pass to the front of the burner and be exploded. This is a feature of considerable importance, as in starting the engine the valve will usually be moved quite slowly, so that considerable time will elapse between the cutting off of communication between the recess 31 and the port 85 and the bringing of said recess into communication with the port 8, and were it not for this feature the flame of the burner would be liable to become smothered before the valve arrived in position to fire the mixture in the duct 29. It will also be observed that at the time this explosion takes place the mixture is supplied to the front and rear of the igniting-burner at the same pressure, so that all danger of extinguishing the flame of the burner, even though it is very small, is entirely obviated.

As the piston 130 starts upon its return-stroke, as before stated, the valve 126 will continue to be advanced until it completes its stroke toward the main crank-shaft, which will bring the duct 28 into communication with the chamber 115 and port 18, so as to admit a charge of the explosive mixture on the opposite side of the piston 130, and at the same time the duct 80 will be brought into communication with the channel 38, so that a portion of the explosive mixture admitted to the duct 28 will pass through said duct and channel and the duct 37 to the igniting-burner 32, and thence into the recess 45 and to the permanent burner 41, where it will be ignited, so as to light the igniting-burner 32 in the same manner as already described in connection with the igniting-burner 33. At the same time that this takes place the port 10 of the cavity 119 will be brought into communication with the port 12 of the water-space 125, so that the water from the space 125 will be permitted to pass into the cavity 119, and the duct 29 will be brought into communication with the recess 14, so that air will be permitted to circulate through and fill said duct and clear it of any of the remaining products of combustion resulting from the explosion of the mixture therein, as just described. It will be observed that as the valve 126 continues its forward movement after the firing of the charge in the forward end of the cylinder, as just stated, the port 19 becomes closed by the solid part of the valve and remains closed thereby until after the power-piston has passed the middle of its return-stroke and opened the exhaust to the front of the cylinder. This is a feature of considerable importance, as by this means not only is the entire force of the exploded charge confined in the cylinder, so that no power is wasted, but all danger of a tardy explosion is prevented in case of failure to explode the charge at the proper time, as all communication between the igniting-burner and the cylinder is cut off as soon as the port 4 passes the port 19. After the piston 130 has passed the middle of its return-stroke, so as to close the exhaust to the rear of the cylinder, the piston 124 will have reached the limit of its return-stroke and the valve 126 will be reversed, as already described, so as to shut off communication between the chamber 115 and port 18, and as the piston 130 reaches the limit of its return-stroke the valve 126 will arrive in position to cut off communication between the igniting and permanent burners 32 41, and to bring the port 3 into communication with the port 18 and the port 7 into communication with the recess 30, so as to fire the charge confined in this end of the power-cylinder and again start the power-piston upon its forward stroke. As the power-piston commences its forward stroke the valve 126 will continue its movement in the opposite direction, so as to close the port 18 in the manner just described in connection with the port 19 and bring the port 10 of the cavity 119 into communication with the port 19, which will allow the steam to escape from said cavity 119 through the port 19 into the power-cylinder, and thus aid in driving out the products of combustion through the exhaust-ports 138 and also in lubricating the interior of the cylinder. As the valve 126 reaches the limit of its return-stroke the port 9 of the cavity 119 will be brought into communication with the port 11 of the water-space 125, so as to permit water to pass from the space 125 into the cavity 119 of this end of the valve, and at the same time the duct 28 will be brought into communication with the recess 13, so as to permit the air to circulate through and fill said duct to clear it of any of the remaining products of combustion. At the same time that this takes place the duct 29 will be again brought into communication with the chamber 115 and port 19, so as to again admit a charge of explosive mixture to the forward end of the power-cylinder, and at the same time drive the air confined in said duct into the power-cylinder in advance of said charge, and also at the same time light the igniting-burner 33, so as to effect the explosion of said charge when the valve has been reversed, as already described. Upon this second reversal of the valve to fire the second charge in the front end of the power-cylinder the port 9 will be brought into communication with the port 18, so as to supply the rear end of the cylinder with steam to aid in expelling the products of combustion from that end of the cylinder, the same as just described in connection with the front end, and so the operation will be repeated, the charges of the explosive mixture being admitted to and fired alternately in the opposite ends of the cylinder. As the power-piston arrives at each end of its stroke the plunger 52 will be operated, so as to permit a quantity of water to pass through the pipe 50 to the groove 47, so as to prevent the flame caused by the explosion of the charge in one end of the cylinder from being communicated to the explosive mixture, which is at the same time being admitted into the opposite end of the cylinder, as already explained.

If at any time the speed of the engine becomes unduly retarded or accelerated from any temporary cause, the cock 20 will be operated through the plunger 59 in the manner already explained, so as to increase or diminish the amount of gas which enters into the explosive mixture, and thus strengthen or weaken said mixture so as to increase or reduce the power of the engine, and thus bring it back to its normal speed.

If it is desired to stop the engine, all that is necessary is to turn the cock 56 to the position shown in Fig. 22, which will shut off the further admission of the explosive mixture to the power-cylinder. The momentum of the parts in slowing down and coming to rest will, however, cause the piston 124 to make several strokes, so as to force several charges of the explosive mixture into the tank 142, as already explained, so that when it is desired to again set the engine in motion it can be done by simply lighting the permanent burners 41 42 and turning the cock 56 to position shown in Fig. 23, and then moving the valve 126 into position to admit a charge from the tank, and then further moving said valve into positio to fire said charge, after which the cock 56 will be turned to the position shown in Fig. 4, when the engine will resume its normal operation.

Although I have in the present case shown the invention as embodied in a horizontal engine, as, all things considered, I regard this as the best form for a double-acting engine, yet it will readily be seen that by a very slight modification in the construction of certain of the parts the invention may be embodied in an engine of the vertical form, if such form should be preferred. It will also be seen that a single-acting engine, either of the horizontal or the vertical form, can readily be constructed so as to embody many of the features of the present invention. To do this it would only be necessary to omit one of the ducts 28 or 29 and its co-operating ports, &c., from the valve 126 and leave the corresponding end of the power-cylinder open. In such case a single instead of a double-acting pump will be employed to force the explosive mixture into the power-cylinder. It may also be remarked in passing that, if preferred, a single-acting pump may be used in connection with a double-acting power-piston, but in such case the pump will have to be speeded up so as to make two strokes to one of the power-piston, and this will not be found desirable.

Some of the modifications which may be made in the details of the organization herein shown without departing from the invention have already been mentioned. Modifications may also be made in many of the other details—as, for example, the cylinder 51 and plunger 52 may be dispensed with, and cocks or valves employed to control the admission of the water to the ports 48 49 and groove 47, such cocks or valves being operated from the rod 54 or other moving part of the engine; or any other suitable device may be employed in place of the plunger for effecting the admission of the water to the groove 47. So, also, the cock 56 may be dispensed with, the pipe 114 and branch 108 being provided with separate cocks, or a cock of different form may be substituted for the cock 56.

What I claim is—

1. A mixing apparatus for a gas-engine, consisting of a number of ducts or channels which are arranged to intersect and cross each other, and through which the air and gas are caused to pass before they enter the cylinder of the engine, substantially as described.

2. In a mixing apparatus for gas-engines, the combination, with the chamber 111, of the concentric tubes 3, having the spirally-arranged intersecting grooves or channels 2, substantially as described.

3. The combination, with the power-cylinder having its exhaust-outlet located in position to be uncovered by the power-piston as it arrives at the end of its stroke, of a pump for forcing the charges of the explosive mixture directly into the power-cylinder while the power-piston is making its stroke toward the end of the cylinder into which the charge is being forced, substantially as described.

4. The combination, with the power-cylinder having its exhaust-outlet located in position to be uncovered by the power-piston as it arrives at the end of its stroke, of a pump for forcing the charges of the explosive mixture directly into the power-cylinder while the power-piston is making its stroke toward the end of the cylinder into which the charge is being forced, the piston of the pump being arranged to complete its stroke in advance of the power-piston, substantially as described.

5. The combination, with the power-cylinder having its exhaust-outlet located in position to be uncovered by the power-piston as it arrives at the end of the stroke, of a pump for forcing the charges of the explosive mixture directly into the power-cylinder while the power-piston is making its stroke toward the end of the cylinder into which the charge is being forced, the piston of the pump being arranged to complete its stroke in advance of the power-piston, and a valve for closing the induction-port at the same time that the pump-piston completes its stroke, substantially as described.

6. The combination, with the power-cylinder having induction-ports at its opposite ends and an exhaust-outlet at its middle, of a pump for forcing the charges of the explosive mixture directly into the power-cylinder while the power-piston is making its stroke toward the end of the cylinder into which the charge is being forced, substantially as described.

7. The combination, with the power-cylinder having induction-ports at its opposite ends and an exhaust-outlet at its middle, of a pump for forcing the charges of the explosive mixture directly into the power-cylinder while the power-piston is making its stroke toward the end of the cylinder into which the charge is being forced, the piston of the pump being arranged to complete its stroke in advance of the power-piston, substantially as described.

8. The combination, with the power-cylinder having induction-ports at its opposite ends and an exhaust-outlet at its middle, of a pump for forcing the charges of the explosive mixture directly into the power-cylinder while the power-piston is making its stroke toward the end of the cylinder into which the charge is being forced, the piston of the pump being arranged to complete its stroke in advance of the power-piston, and a valve for closing the induction-port at the same time that the pump-piston completes its stroke, substantially as described.

9. The combination, with the power-cylinder having an induction-port at its end and its exhaust-outlet in position to be uncovered by the power-piston as it arrives at the end of its stroke, of a pump for forcing the charges of the explosive mixture into the power-cylinder while the power-piston is making its stroke toward the end of the cylinder into which the charge is being forced, the piston of the pump being set in advance of the power-piston, and a valve for opening the induction-port after the piston of the pump has commenced its stroke, and for closing the port at the same time that the pump completes its stroke, substantially as described.

10. The combination, with the power-cylinder having induction-ports at both ends and an exhaust-outlet at its middle, of a double-acting force-pump for charging said cylinder, the piston of said pump being set in advance of the piston of the power-cylinder, and a single positively-actuated valve for opening said induction-ports after the piston of the pump has commenced its stroke, and for closing said ports simultaneously with the completion of the stroke of said pump-piston, substantially as described.

11. The combination, with the power-cylinder having induction-ports at both ends and an exhaust-outlet at its middle, of a double-acting force-pump for charging said cylinder, the piston of said pump being set in advance of the piston of the power-cylinder, and a single valve arranged to open said ports after the piston of the pump has commenced its stroke, to close said ports simultaneously with the completion of the stroke of the pump-piston, and to fire the charge in the cylinder at or after the completion of the stroke of the power-piston, substantially as described.

12. In a gas-engine, the combination, with a power-cylinder and a double-acting power-piston, of a pump for forcing the charges of the explosive mixture into said cylinder, and a single exhaust-port or set of ports located at or near the middle of the length of the cylinder and uncontrolled by an exhaust-valve, through which the products of combustion are exhausted from both ends of the cylinder, substantially as described.

13. In a gas-engine, the combination, with a power-cylinder and stationary, permanent, and igniting burners, of a single valve provided with means for admitting a charge to the cylinder and confining the same therein, and with means for establishing communication between the permanent and igniting burners to light the latter, and for then establishing communication between the igniting-burner and the charge in the cylinder to fire the same, substantially as described.

14. In a gas-engine having a double-acting piston, and stationary, permanent, and igniting burners for each end of the cylinder, of a single valve provided with means for admitting the charges to the cylinder and confining them therein, and with means for establishing communication between the permanent and igniting burners to light the latter, and for establishing communication between the igniting-burners and the charges to fire them, substantially as described.

15. The combination, with the power-cylinder and an igniting-burner for firing the charges in the cylinder, of a valve having a duct or chamber through which the explosive mixture passes in entering the cylinder, and in which a portion of the mixture is confined when the induction-port is closed, a port controlled by a check-valve which communicates with the duct and cylinder, and a port which is brought into communication with the igniting-burner by the movement of the valve, substantially as described.

16. The combination, with the power-cylinder and an igniting-burner for firing the charges in the cylinder, of a valve having a duct or chamber through which the explosive mixture passes in entering the cylinder; and in which a portion of the mixture is confined when the induction-port is closed, a port controlled by a check-valve which communicates with the duct and cylinder, a port which is brought into communication with the igniting-burner by the movement of the valve, and means by which the igniting-burner is fed from the mixture confined in the duct until the firing takes place, substantially as described.

17. The combination, with the pump for forcing the charges into the power-cylinder, of the charging and firing valve for admitting, confining, and firing the charges in the cylinder, the valve being so constructed and timed that the induction-port will be opened to admit the charge to the cylinder at the time the valve is completing its stroke in one direction and commencing its stroke in the opposite direction, and that the charge will be fired before the valve completes its stroke after admitting the charge, and the pump-piston being so timed with relation to the valve that it will commence its stroke before the induction-port is opened and complete its stroke simultaneously with the closing of the induction-port, substantially as described.

18. In a gas-engine, the combination, with a power cylinder, of means for supplying a quantity of steam to the same in advance of the charge of the explosive mixture, substantially as described.

19. In a gas-engine, the combination, with the power-cylinder having spaces 125 and a port or ports, 11 12, of the valve 126, having cavities 119, and a port or ports, 9 10, arranged substantially as described, and for the purposes set forth.

20. In a gas engine, the combination, with the power-cylinder, of a valve having a duct through which the explosive mixture passes in charging the cylinder, and means by which said duct is filled with air previous to the passage of each charge of the explosive mixture through the same, substantially as described.

21. The combination, with the power-cylinder and stationary, permanent, and igniting burners, of a firing-valve constructed and operated to establish communication between the permanent and igniting burners to light the latter, and to then establish communication between the igniting-burner and the charge to fire it, and a check-valve for closing the firing-port as soon as the charge is fired, substantially as described.

22. In a gas-engine, an igniting-burner provided with a cup-shaped body, 34, arranged to surround and protect the flame, substantially as described.

23. In a gas-engine, an igniting-burner consisting of a cup-shaped body, 34, the bottom of which is provided with a hollow plug having an annular flange, 16, substantially as described.

24. The combination, with the power-piston having the circumferential groove or recess 47, of a port or ports formed in the cylinder through which water is admitted to said groove as the piston reciprocates, substantially as described.

25. The combination, with the power-cylinder having the ports 49, of the piston provided with the groove or recess 47, the water-pipe 50, cylinder 51, and plunger 52, substantially as described.

26. In a gas-engine, the combination, with a cock or valve for controlling the quantity or richness of the explosive mixture supplied to the power-cylinder, of the plunger 59, valve 72, and connections, substantially as described.

27. The combination, with the cock 20, for controlling the amount of gas admitted to the explosive mixture, of a governor for controlling said cock, whereby as the speed of the engine increases the amount of gas admitted to the mixture is decreased, and the valve 22, for controlling the openings through which the air and gas enter the mixing-chamber, substantially as described.

28. The combination, with the cock 20, for controlling the richness of the explosive mixture, of the plunger 59, valve 72, and connections, substantially as described.

29. The combination, with the cock 20, for controlling the richness of the explosive mixture, of the plunger 59 upon the valve-rod 129, the valve 72, and connections, substantially as described.

30. The combination, with a cock or valve for controlling the quantity or richness of the explosive mixture supplied to the power-cylinder, of the plunger 59 upon the valve-rod 129, the valve 72, and connections, substantially as described.

31. The combination, with a cock or valve for controlling the quantity or richness of the explosive mixture supplied to the power-cylinder, of the plunger 59 upon the valve-rod 129, the valve 72, cock 71, and connections, substantially as described.

32. The combination, with the power-cylinder, of a pump for supplying the explosive mixture to said cylinder, a tank, and connections between said cylinder, pump, and tank, by which the explosive mixture may be allowed to pass from the pump either directly to the power-cylinder or to the tank, and by which the cylinder may be supplied either from the pump or from the tank, substantially as described.

33. The combination, with the power-cylinder, the pump for supplying the explosive mixture thereto, and the tank 142, of the pipe 114, leading from the pump to the cylinder, the branch 108, leading to the tank, and the cock 56, for controlling said pipe and branch, substantially as described.

In testimony whereof I have hereunto set my hand in the presence of two subscribing witnesses.

PETER MURRAY, JR.

Witnesses:
J. A. HOVEY,
T. H. PALMER.